Aug. 10, 1926.
R. A. McCARTY
1,595,800
BAFFLE MECHANISM FOR THRUST BEARINGS
Filed Oct. 23, 1925
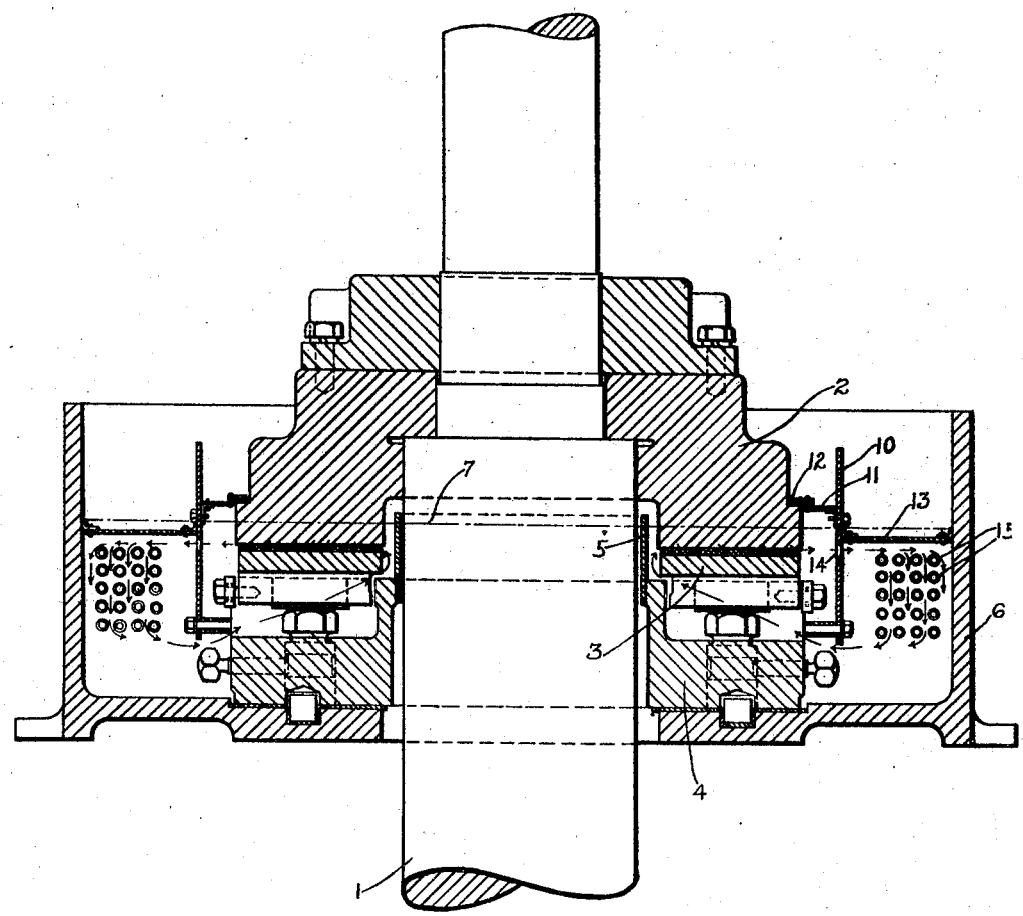
WITNESSES:
R.S. Williams
O.B. Buchanan
INVENTOR
Roy A. McCarty
BY
Wesley G. Carr
ATTORNEY Patented Aug. 10, 1926.

1,595,800

UNITED STATES PATENT OFFICE.

ROY A. McCARTY, OF WILKINSBURG, PENNSYLVANIA, ASSIGNOR TO WESTINGHOUSE ELECTRIC & MANUFACTURING COMPANY, A CORPORATION OF PENNSYLVANIA.

BAFFLE MECHANISM FOR THRUST BEARINGS.

Application filed October 23, 1925. Serial No. 64,361.

My invention relates to thrust bearings, and it has particular relation to the prevention of the admixture of air bubbles in the lubricating oil for thrust bearings of the vertical-shaft type.

My invention consists of an efficient baffle arrangement, in accordance with the purpose just indicated, which is far more simple in construction than anything heretofore proposed.

The single figure of the drawing is a fragmentary, longitudinal section of a bearing embodying my invention in a preferred form.

As shown in the drawing, the upper end of a vertical shaft 1 is provided with a sleeve 2, the bottom surface of which constitutes a thrust bearing surface which rests upon bearing shoes 3 suitably mounted upon a supporting frame 4, as is well known in the art. The supporting frame 4 is provided with upwardly-extending inner and outer cylindrical walls 5 and 6, respectively, for receiving the lubricating oil, the top level of which is indicated at 7.

My present invention relates to means for reducing the turbulence and oxidation of the oil. Due to the action of centrifugal force, the oil is thrown outwardly from the bearing surfaces, whence it moves downwardly in the outer portion of the oil-holding receptacle and then moves up past the bearing shoes to the inner end of the bearing surfaces. The outward centrifugal movement of the oil in high-speed bearings is so great that if preventive measures were not adopted, the oil would pile up at the outer edge of the oil receptacle, causing considerable air to become mixed therewith.

According to my invention, an extremely simple and convenient baffle supporting mechanism is provided, consisting of a cylindrical baffle 10, the bottom of which is supported in spaced relation from the supporting frame 4. The top of the cylindrical baffle 10 extends above the oil level and is provided with an inwardly-extending annular flange 11, the inner circumference of which is provided with a felt washer 12 or other suitable means for making a substantially airtight joint with the shaft 1 or the collar 2 thereof.

Immediately below the oil level 7, the oil-holding receptacle is bridged by an approximately oil-tight horizontal plate 13 joining the cylindrical baffle 10 to the outer wall 6 of the receptacle. At a height opposite the bearing surfaces, the cylindrical baffle is provided with a row of perforations 14 which are disposed below the horizontal plate 13. Cooling coils 15 are provided in the space opposite the cylindrical baffle 10 and below the horizontal plate 13, the circulation of the oil being indicated by the arrows.

The purpose of the horizontal plate 13 bridging the space between the cylindrical baffle plate 10 and the receptacle wall 6 is to prevent the piling up of the oil at the outer periphery of the receptacle by reason of the rapid rotation of the oil which is imparted by the high-speed shaft. The horizontal plate 13 also serves the purpose of preventing the entrance of air into contact with the highly agitated oil which is expelled from the bearing surfaces, in order to prevent the churning of the air in close contact with the oil. For these purposes, the horizontal plate 13 should make an approximately air-tight joint with the vertical cylindrical baffle 10 and the vertical receptacle wall 6.

From the foregoing description, it will be apparent that I have provided an extremely simple and convenient arrangement of baffles whereby the churning and oxidation of the oil is reduced to a minimum, thus avoiding one of the difficulties in the design and operation of high-speed thrust bearings for heavy machinery.

I claim as my invention:

1. A thrust bearing for vertical shafts, comprising an oil-holding receptacle, a vertical cylindrical baffle supported within said receptacle and extending above the oil level therein, a horizontal annular flange extending inwardly from the upper end of said baffle, means at the inner circumference of said flange for providing a substantially air-tight joint with the shaft, an approximately oil-tight horizontal plate disposed slightly below the oil level and bridging the space between said baffle and the outer wall of said oil-holding receptacle, the vertical cylindrical baffle having a series of perforations below said plate and substantially opposite to the thrust bearing surfaces, and cooling means disposed below said plate and opposite to said baffle.

2. A thrust bearing for vertical shafts, comprising an oil-holding receptacle, a vertical cylindrical baffle supported within said receptacle and extending above the oil level therein, a horizontal annular flange extending inwardly from the upper end of said baffle, means at the inner circumference of said flange for providing a substantially air-tight joint with the shaft, said baffle having a series of perforations opposite to the thrust bearing surfaces, and means for preventing the piling up of the oil near the outer periphery of said receptacle by reason of the effects of centrifugal force.

3. A thrust bearing for vertical shafts, comprising an oil-holding receptacle, a vertical cylindrical baffle supported within said receptacle, and approximately oil-tight horizontal plate disposed slightly below the oil level and bridging the space between said baffle and the outer wall of said oil-holding receptacle, the vertical cylindrical baffle having a series of perforations below said plate and substantially opposite to the thrust bearing surfaces, and auxiliary means mounted on the upper end of said baffle for preventing the admixture of air with the oil between said baffle and the shaft.

In testimony whereof, I have hereunto subscribed my name this 28th day of September 1925.

ROY A. McCARTY.